Sept. 21, 1954  F. E. SMITH  2,689,670
RELIEF VALVE FOR SUBMERGED PUMPS
Filed Feb. 25, 1949  2 Sheets-Sheet 1
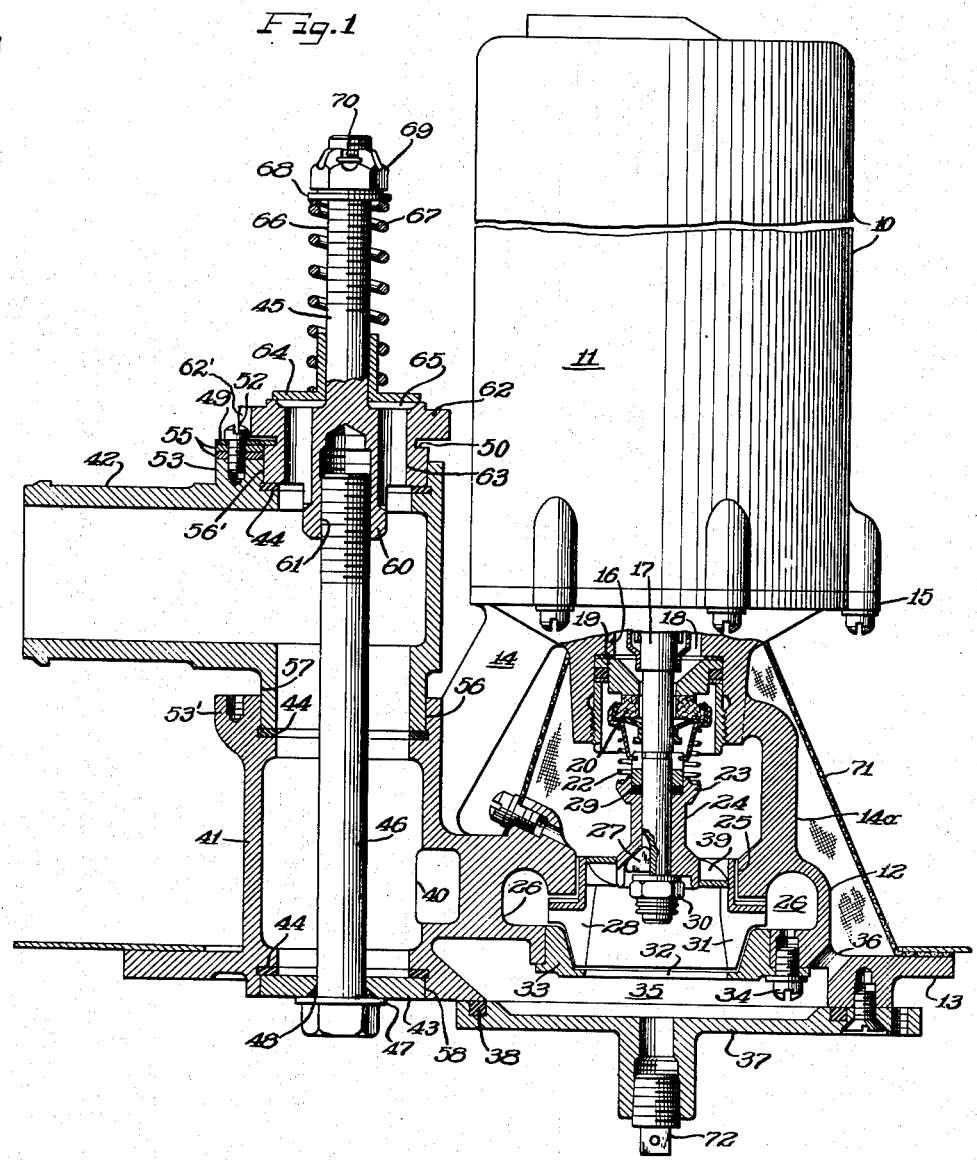
Inventor
Frederick E. Smith
By The Firm of Charles Hills Attys

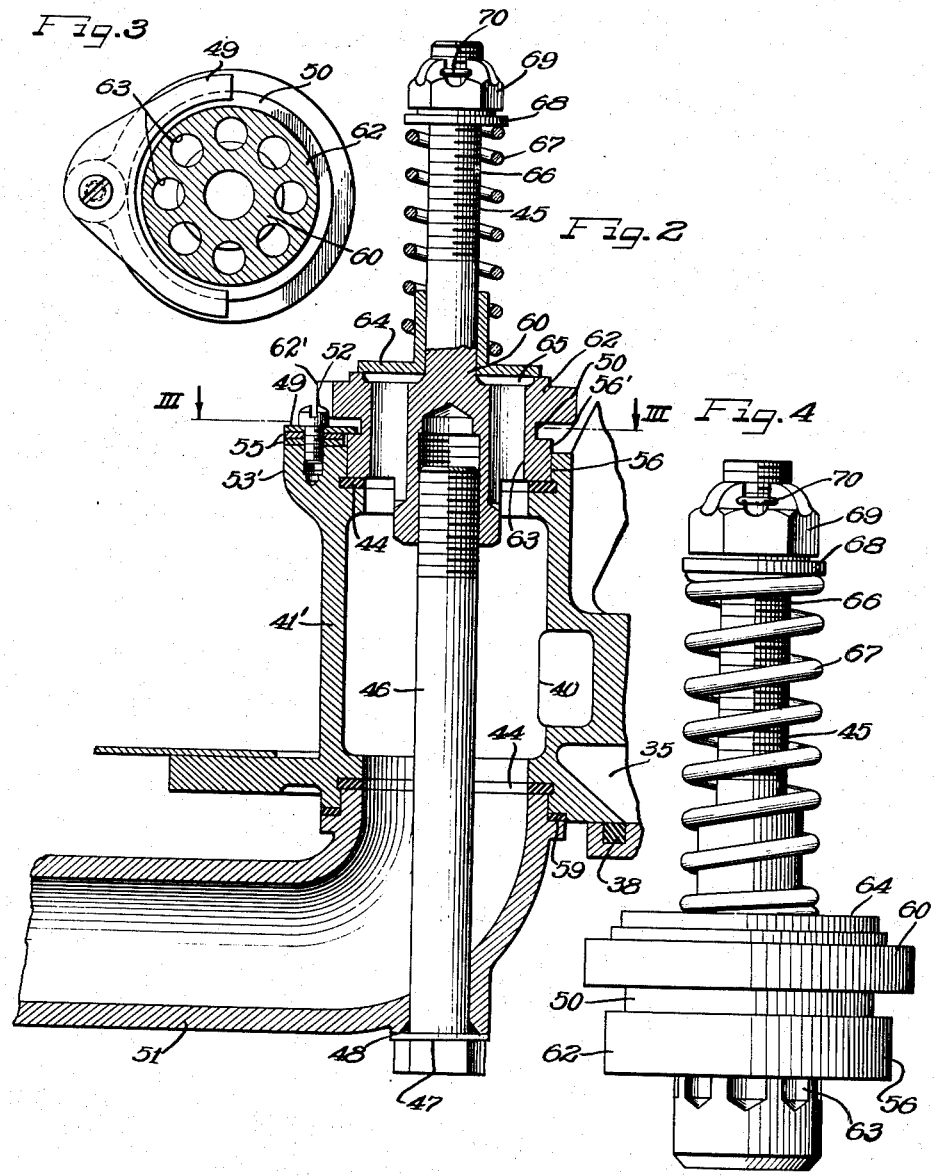

Patented Sept. 21, 1954

2,689,670

UNITED STATES PATENT OFFICE 2,689,670

RELIEF VALVE FOR SUBMERGED PUMPS

Frederick E. Smith, Cleveland Heights, Ohio, assignor to Thompson Products, Inc., Cleveland, Ohio, a corporation of Ohio Application February 25, 1949, Serial No. 78,441

7 Claims. (Cl. 222—318)

This invention relates to a pump assembly adapted to be mounted inside of a tank and readily connected to a discharge line which is either inside or outside the tank.

Specifically, the invention relates to a submerged booster pump assembly arranged for easy mounting inside of an airplane fuel tank such as a tank in the wing of an airplane for pumping gasoline from the interior of the tank to either an internal or external discharge line.

More specifically, this invention relates to a submerged booster pump having a pressure relief valve in conjunction with an inside and outside nipple whereby production and assembly is simplified by a common pressure relief valve assembly which is adapted to be interchangeable for use in either an internal or external discharge line.

High altitude fuel systems for airplanes usually include a centrifugal type pump receiving gasoline by gravity from the airplane gasoline tank and pressuring this fuel into a fuel line to a positive displacement type pump such as a rotary vane pump driven by the airplane engine. The booster pump is driven by a source independent of the engine such as, for example, an electric motor. In airplane wing tank installations, it is convenient to mount the booster pump inside of the tank, since frequently there is not sufficient space available for an outside tank mounting. This invention now provides a booster pump assembly adapted for quick mounting inside of an airplane wing tank to pressure fuel in the tank to either a delivery line extending into the tank or an external delivery line. It has been found that in certain instances, however, it is necessary to provide a submerged booster pump with a relief valve so that the pressure in the system will not exceed a value determined by the carburetor sensitivity. Booster pump assemblies of this type also usually include a by-pass valve through which fuel may be forced from the suction to the discharge side of the power pump by means of an auxiliary hand-operated pump, the hand-pump being available in an emergency when for any reason the power pump fails to deliver the fuel. The booster pump assemblies in this invention are thus universally useful in airplane installations having fuel lines which either extend into the tank or terminate outside of the tank.

A feature of this invention includes the provision of a pump casing adapted for direct attachment to the wall of a fuel tank for supporting an electric motor and pump mechanism inside of the tank while also providing connections for both an inside tank fuel delivery line and an outside tank fuel delivery line in conjunction with a relief valve so that the pressure of the system will not exceed a value determined by the carburetor sensitivity.

It is, then, an object of the invention to provide a pump assembly adapted for attachment to a tank and a fuel line located either inside the tank or outside the tank in conjunction with a pressure relief valve located solely within the tank.

A further object of the invention is to provide a submerged type pump for mounting in a tank with an outlet that is readily connected to a fuel line extending into the tank or wholly outside of the tank in which the outlet is provided with a relief valve so that the pressure of the system will not exceed a value determined by the carburetor sensitivity.

A still further object of the invention is to provide a very compact submerged type booster pump including a pressure relief valve occupying very little space outside of the tank.

A still further object of the invention is to provide mounting mechanism for submerged type pumps which greatly facilitates the installation of the pumps in a tank including a pressure relief valve which is readily adapted for attachment either to a fuel line located either inside the tank or outside the tank.

A still further object of the invention is to provide internal and external fittings useful with a single booster pump assembly in conjunction with the pressure relief valve assembly to render the assembly operative for connection with a fuel line extended into a fuel tank or a fuel line which is wholly outside of the tank.

A further object of the invention is to provide a pump whose discharge pressure is limited to a value below that capable of being produced by the pump.

A further object of the invention is to provide a by-pass mechanism in the discharge line from the pump which is operable through a predetermined discharge pressure.

A still further object of the invention is to provide a spring pressed relief valve mechanism for the discharge outlet of a pump which has been adapted for connection with a fuel line extended into a fuel tank or a fuel line which is wholly outside of a tank.

Another object of the invention is to provide an adjustable pressure relief valve of unitary construction and adaptable for ready interchangeability for connection with a fuel line extended into a fuel tank or a fuel line which is wholly outside of the tank.

The novel features which I believe to be characteristic of my invention are set forth with particularity in the appended claims. My invention itself, however, both as to organization and manner of construction, together with further objects and advantages thereof, may best be understood by reference to the following description taken in connection with the accompanying drawings, in which:

Figure 1 is a side-elevational view, with parts broken away and shown in vertical cross section, of a submerged booster pump assembly according to this invention equipped with an inside tank discharge fitting;

Figure 2 is a side-elevational view of the construction of Figure 1 illustrating the outlet connection of a submerged booster pump including a pressure relief valve construction according to this invention arranged for discharging into a fuel line disposed entirely outside of the tank;

Figure 3 is a cross-sectional view, taken along lines III—III of Figure 2, illustrating the retainer construction for the pressure relief valve; and, Figure 4 is an elevational view of the pressure relief valve detached from the pump assembly.

As shown on the drawings:

In accordance with this invention, a booster pump unit 10 composed of an electric motor and a centrifugal type pump is mounted in a wing tank as illustrated in the U. S. Patent No. 2,361,-747, granted October 31, 1944 to R. R. Curtis et al.

As shown in Figure 1, the booster pump 10 includes an electric motor casing 11, and a pump casing 12 carrying the motor casing 11. The pump casing 12 has a base plate portion 13 with a plurality of stud-receiving portions around the marginal portion thereof, especially formed with an upstanding shoulder for fitting into an opening of the tank to which it is assembled. The assembly is mounted as particularly disclosed in the aforementioned U. S. Patent.

A pedestal 14 extends from the base portion of the pump to carry an annular portion 15 in spaced relation above the base portion. The motor casing 11 is mounted on this annular portion 15. The annular portion 15 has an inner boss 16 carrying a bearing (not shown) for a motor shaft 17. The boss 16 provides a shaft well 18, in which can be mounted a stationary seal ring 19 receiving the shaft 17 therethrough. A rotating seal ring 20 is enclosed around the shaft and maintained in sliding face-to-face engagement with a stationary ring 19 by means of a spring 22, mounted on a shoulder 23 of a sleeve member 24 disposed around the shaft. The particular seal construction is disclosed and claimed in the U. S. Patent 2,373,463, of R. R. Curtis, granted April 10, 1945.

The pump casing 12 is provided with a discharge passage 25 for the bubbles of gas and vapor discharged from the pump and is also provided with a pumping chamber or volute 26. The sleeve 24 is keyed to the shaft 17 by an impeller key 27. The impeller 28 is secured to the sleeve 24 in a well known manner. Shims 29 are provided to properly adjust the impeller within the complementally formed impeller chamber. A self-locking impeller nut 30 threaded on the lower end of the drive shaft 17, in conjunction with a suitable lock washer, secures the key 27 in position to connect the impeller 28 with the drive shaft so that relative rotation will not occur therebetween.

The impeller 28 mounted on the shaft 17 has pumping vanes 31, which form a separating chamber for the bubbles of gas and vapor, extending from a throat inlet 32 formed by an annular member or throat ring 33. The throat ring is complementally formed with regard to the vanes 31 and suitably secured by securing means 34 to the pump casing 12. Chamber or sump 35 connected by ports 36 permit fuel to flow from the tank to the chamber 35, permitting the pump to withdraw all of the fuel from the tank and the draining thereof. And end cap 37 forms an enclosure for the chamber 35 and a gasket 38 takes up any clearance between the base plate 13 and the end cap 37 to seal the cap to the base. The end cap is suitably secured as illustrated. A propeller 39 is also suitably affixed along with the impeller 28 to the sleeve 24 so that both the propeller 39 and the impeller 28 are secured together.

The pumping chamber 26 discharges through a port 40 in the base portion 13. The port 40 communicates with a vertical cylindrical discharge passageway 41 defined by a boss on the base portion 13. This cylindrical discharge passageway 41 is open-ended and is adapted to receive a fitting at either end thereof. The discharge passageway 41 may also be provided with a by-pass valve (not shown) in case of failure of the booster pump. As shown in Fig. 1, a conduit fitting 42 is mounted in the upper end of the discharge passageway 41 and the lower end of the passageway is closed by an end cap 43 and sealed with a gasket 44. A similar gasket 44 also seals the fitting 42 to the discharge passageway 41.

The fitting 42 is provided with an opening illustrated in Fig. 1 to receive a pressure relief valve construction 45. In the assembly, as illustrated in Fig. 1, of the relief valve construction 45, the conduit fitting 42, and the pressure relief valve 45 sealed by a gasket 44 are secured to the cylindrical discharge passageway 41 by a bolt 46 provided with a suitable washer 47 and gasket 48.

A retainer 49 (Figs. 1, 2 and 3) engages an annular groove 50 to secure the pressure relief valve 45 in position on the discharge passageway 41 whenever it is desired to disassemble the conduit 42 (for example, Fig. 1), or the external conduit 51 (Fig. 2). Securing means 52 (Figs. 1 and 2) are adapted to secure the retainer 49 to a boss 53 formed on the conduit 42 and a similarly formed boss 53 on the boss which forms passageway 41 to make it possible for the discharge passageway 41 of the booster pump assembly to be adapted for mounting the pressure relief valve either with an internal conduit fitting 42 or an external conduit fitting 51. Spacing washers 55 permit the proper positioning of the retainer 49 with respect to the annular groove 50 of the pressure relief valve.

Referring to Figure 2, the pressure relief valve construction 45 is also particularly adapted for mounting an external conduit fitting 51 to the booster pump assembly in which the fitting is connected exteriorly of the tank; whereas, in the other embodiment of the invention, the conduit fitting 42 is adapted for mounting within the tank. In Figure 2, the pressure relief valve 45 is adapted to be mounted within an opening 56 in a discharge passageway 41' formed like the discharge passageway 41 in the embodiment of Fig. 1 and is similarly formed as the lower portion 56' of the pressure relief valve 45 and the connecting portion 57 of the conduit fitting 42.

By thus mounting the discharge passageway 41', the pressure relief valve 45, and the conduit fitting 42, it is evident that the pressure relief valve 45 may be interchangeably mounted on the fitting 42 and on the discharge passageway 41' depending upon whether the booster pump is to be provided with an external or internal fitting. The external fitting 51 is also complementally formed with respect to the opening 58 formed in the base plate 13, to receive either the end cap 43, as illustrated in Figure 1, when an internal conduit fitting 42 is used, or to receive a complementally formed portion of the conduit 51, as illustrated in Figure 2, when an external fitting is used.

The gasket 44, as previously described, and a gasket 59 serve to seal the assembled fittings when they are assembled, as illustrated in Figure 2, and secured by the bolt 46 in conjunction with the washer 47 and gasket 48. The retainer 49 for the pressure relief valve 45 is suitably affixed to the discharge passageway 41' by securing means 52 engaging with boss 53' similarly formed as the boss 53 for the conduit fitting 42 to provide for an interchangeability of parts.

Referring to Figures 1 to 4, inclusive, the pressure relief valve assembly 45 is provided with a body member or well 60, provided with a threaded portion 61 adapted for threaded engagement with the securing means 46 at the lower end and an intermediate cylindrical portion 62 in which is formed the annular groove 50 for receiving the retainer 49. The portion 62 is also provided with a half-circular notch 62' milled therein to clear the head of the screw 52 and to prevent rotation of the relief valve as the bolt 46 is tightened. The portion 62 is also provided with a plurality of openings 63, Figs. 1, 3 and 4, which in the assembled position of the pressure relief valve are in communication, for example, with the interior of the conduit fitting 42, Fig. 1, and in the use of the external conduit fitting 51, Fig. 2, these openings 63 are in communication with the interior of the discharge passageway 41'.

A valve relief member 64 provides a closure for the chamber 65 to which the openings 63 are connected. The valve relief member 64 is mounted upon an upstanding threaded member or stem 66, and is spring-biased by a compression spring 67.

The compression of the spring is adjusted by a spring retainer 68 and a castle nut 69 in threaded engagement with the threaded member 66. The compression of the spring 67 of the relief valve is preferably adjusted so that the pressure within the system will not exceed a value determined by the carburetor sensitivity. Upon the correct adjustment of the spring pressure, the nut 69 is locked into position by cotter pin 70.

The space between the conical end of the front portion and the upstanding portion 14a of the base plate 13 is surrounded by a screen 71.

The electric motor will drive both the propeller 39 and the impeller 28. When the pump is submerged in the fuel in the tank, this fuel will be pumped by the impeller 28 through the pumping chamber 26, discharge port 40, vertical discharge passageway 41, and conduit fitting 42 to a suitable discharge line connected thereto. When the pump is assembled as in Figure 2 rather than as in Figure 1, the fuel is discharged through the passageway 41' to the external conduit 51, as illustrated. The propeller 39 is effective to direct bubbles of gas and vapor away from the discharge 25 of the pump and cause these bubbles to be forced outwardly through the screen 71 so that the vapor lock will not occur in the fuel line. The construction of the pump is effective to feed only liquid fuel to the impeller 28.

The end cap 37 may have a central plug 72 therein permitting drainage of impurities from the pump chamber 35 without removal of the end cap 37.

As shown in Figure 1, the booster pump assembly is readily inserted into a tank having an inside discharge line by first mounting the fitting 42 on the discharge line on the inside of the tank after the pressure relief valve 45 has been first assembled to the fitting 42. The opening in the tank permits access to the interior of the tank for attaching the fitting and the pressure relief valve onto the discharge line. After the fitting has been assembled onto the discharge line, the pump assembly may then be fitted into the opening of the tank and the discharge passageway 41 of the pump connected to the fitting and pressure relief valve through the bolt 46. The base plate portion 13 then may be secured to a suitable mounting ring in the tank as disclosed in aforementioned U. S. Patent 2,361,747.

The installation of the booster pump assembly 10, is thus very rapid and does not require skilled technicians.

However, when the booster pump assembly is mounted in position in the tank, the end cap 37 can be removed from the base portion 13 without removing the base portion from the tank and the working parts of the pump and motor can be reached from the outside of the tank without disturbing the mounting.

When it is desired to use the pressure relief valve 45 with an exterior conduit fitting 51, as illustrated in Figure 2, the pump assembly together with the relief valve are assembled as described with reference to Figure 1, and the pressure relief valve is assembled on the passageway 41' as illustrated in Figure 2. The pump is then assembled within the tank as described above. The conduit 51 which may be assembled to an exterior fuel line is then assembled to the passageway 41', by the assembly bolt 46, as illustrated in Figure 2. The conduit 51 is preferably arranged with a recessed upper portion adapted to clear the mounting studs for the base plate portion 13, so that the fitting can be mounted quite close to the bottom of the tank in a very small space between the tank and the lower skin or wall of the wing. The fitting 51 is adapted, of course, to be coupled to an external discharge tube extending into the fuselage. However, from the above description, it will be understood that the pump of this invention includes a pump chamber defining base portion and an electric motor carrying portion held in spaced opposed relation by a single pedestal or leg in order to provide a space into which liquid can flow into the interior of a centrifugal type pump. The base portion is adapted for quick mounting on the bottom wall of a tank and carries an upstanding portion providing a mounting for removable members defining a pump volute chamber and an inlet throat to said chamber communicating with the space. The base plate assembly also includes an upstanding boss defining an open ended discharge chamber which can be closed at the bottom end while connected to a conduit fitting at the top together with a pressure relief valve to accommodate a fuel line extending into the tank or alternately can be closed at the top end with a pressure relief valve, Figure 2, connected with a conduit fitting at the bottom end to accommodate an external fuel line.

The entire arrangement is such that it does not require much external space and the assemblies of this invention are especially useful in airplane wing tank installations where very little clearance is provided between the bottom of the tank and the lower wall of the wing.

It will, of course, be understood that various details of construction may be varied through a

I claim as my invention:

1. The combination with a motor and pump unit adapted to be mounted in a tank and including an open-ended discharge passageway for the pump, a removable conduit fitting connected to one end of the discharge passageway, pressure relief means adapted to be detachably mounted on the other end of said open-ended discharge passageway, and a common securing means extending through the passageway for securing said conduit fitting and said pressure relief means to the ends of said open-ended discharge passageway.

2. The combination with a motor and pump unit adapted to be mounted in a tank comprising an open-ended discharge passageway for said pump, one open end of the passageway communicating with the outside of the tank and the other end of the passageway communicating with the interior of the tank, a removable conduit fitting for one end of said discharge passageway, pressure relief means mounted on the other end of said open-ended discharge passageway, and common retaining means extending through said passageway and detachably securing the pressure relief means to the open-ended discharge passageway at one end thereof and said conduit fitting at the other end thereof.

3. The combination with a motor and pump unit adapted to be mounted in a tank and including an open-ended discharge passageway, a removable conduit fitting detachably mounted on the open-ended discharge passageway, a pressure relief means mounted on the other end of the open-ended discharge passageway, retaining means for detachably securing the pressure relief means to the open-ended discharge passageway, and common securing means for detachably securing the removable conduit fitting and the pressure relief means to the open-ended discharge passageway, whereby said pump can discharge outside of the tank through the conduit fitting and inside the tank through the pressure relief means.

4. In combination with a pump and motor unit adapted to be mounted on a tank wall and submerged in the contents of the tank including a pump casing with a base plate for mounting on the tank wall and having an upstanding pump discharge passageway with an outer end opening through the base plate and an inner end opening in the tank when the plate is mounted on a tank wall, a passaged relief valve body facing the inner end of the passageway, said body having a central internally threaded well with discharge passages therearound and a valve seat on the outer end thereof, a valve coacting with said seat, a spring carried by said body urging the valve against the seat, a member bottomed on the outer end of the discharge passageway, and a bolt accessible from the outer side of the plate extending through said member and threaded into said well to draw the member and body toward the ends of the discharge passageway.

5. In combination with a pump and motor unit adapted to be mounted on a tank wall and submerged in the contents of the tank including a pump casing with a base plate for mounting on the tank wall and having a pump discharge passageway with an outer end opening through the base plate and an inner end opening in the tank when the plate is mounted on a tank wall, an open ended conduit fitting adapted to seat at one end on the inner end of the passageway, a passaged relief valve body seated on the other end of the conduit fitting, said conduit fitting having a discharge opening intermediate the ends thereof, said valve body having a central internally threaded well with discharge passages therearound, and a valve seat on the outer end thereof, a valve coacting with said seat, a spring carried by the valve body urging the valve against the seat, a member bottomed on the outer end of the passageway, and a bolt accessible from the outer side of the plate extending through said member and threaded into said well to draw the member and body toward the ends of the passageway.

6. In a fuel pump system, a construction comprising means defining a discharge passageway having a first opening at one end thereof and a second opening at the other end thereof aligned with said first opening, a conduit fitting in the form of a bend, one end of said fitting being seated in said first opening, a relief valve having one end thereof seated at said second opening, said one end of said valve having a central internally threaded recess therein, said fitting having an aperture in the wall thereof aligned with said threaded recess, and a headed securing member extending through said aperture in said fitting and screwed into said threaded recess.

7. In combination with a pump and motor unit adapted to be mounted on a tank wall and submerged in the contents of the tank including a pump casing with a base plate for mounting on the tank wall and having an upstanding pump discharge passageway with an outer end opening through the base plate and an inner end opening in the tank when the plate is mounted on the tank wall, a passaged relief valve body facing the inner end of the passageway, said body having a central portion with a discharge flow path therearound and a valve seat around the flow path, a spring urged valve carried by said body and urged by said spring against said valve seat, a member bottomed on the outer end of the discharge passageway, and bolt means accessible from the outer side of the plate and extending through the member into connected relation with the central portion of said relief valve body to draw the member and body toward the ends of the discharge passageway.

References Cited in the file of this patent

UNITED STATES PATENTS

| Number | Name | Date |
| --- | --- | --- |
| 82,206 | Chesley | Sept. 15, 1868 |
| 551,011 | Turnbull | Dec. 10, 1895 |
| 1,401,637 | Parkinson | Dec. 27, 1921 |
| 1,405,968 | Christman | Feb. 7, 1922 |
| 1,431,160 | Jorgensen | Oct. 10, 1922 |
| 1,536,760 | Bowler | May 5, 1925 |
| 1,976,464 | Shallenberg | Oct. 9, 1934 |
| 2,343,752 | Curtis | Mar. 7, 1944 |
| 2,361,747 | Curtis et al. | Oct. 31, 1944 |
| 2,510,632 | Hemphill | June 6, 1950 |
| 2,530,357 | Kately | Nov. 14, 1950 |